Jan. 12, 1965    H. W. BIGGE    3,165,336
EXTENDABLE REACH FOR TRACTOR-TRAILER VEHICLES
Original Filed Feb. 24, 1961    3 Sheets-Sheet 1
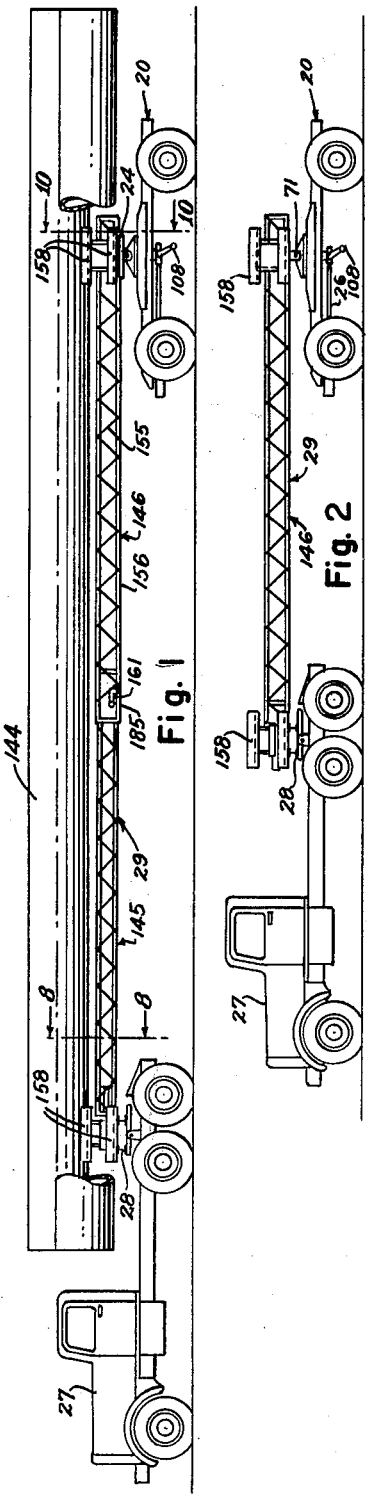
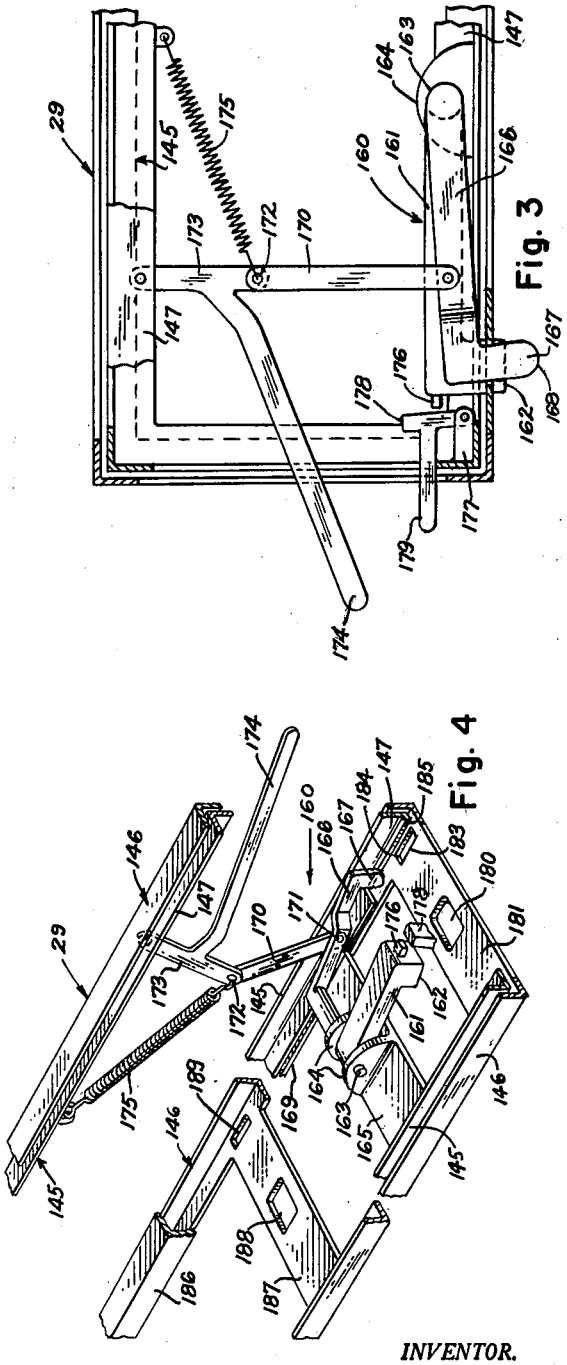
INVENTOR.
HENRY W. BIGGE
BY
ATTORNEY.

Jan. 12, 1965  H. W. BIGGE  3,165,336
EXTENDABLE REACH FOR TRACTOR-TRAILER VEHICLES
Original Filed Feb. 24, 1961  3 Sheets-Sheet 2
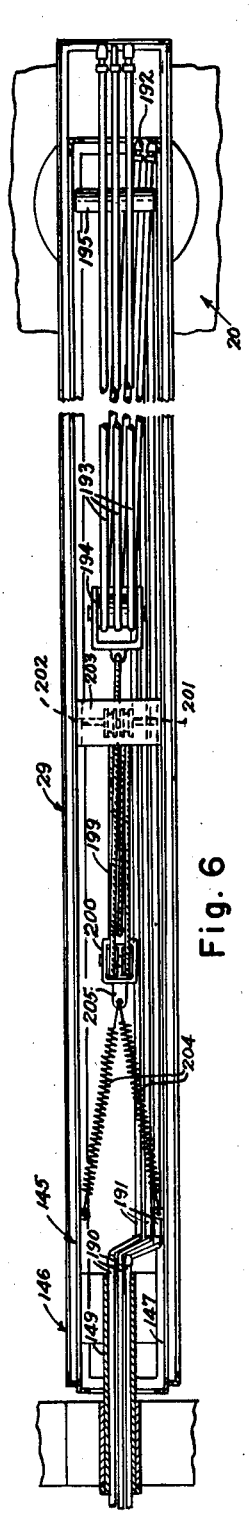
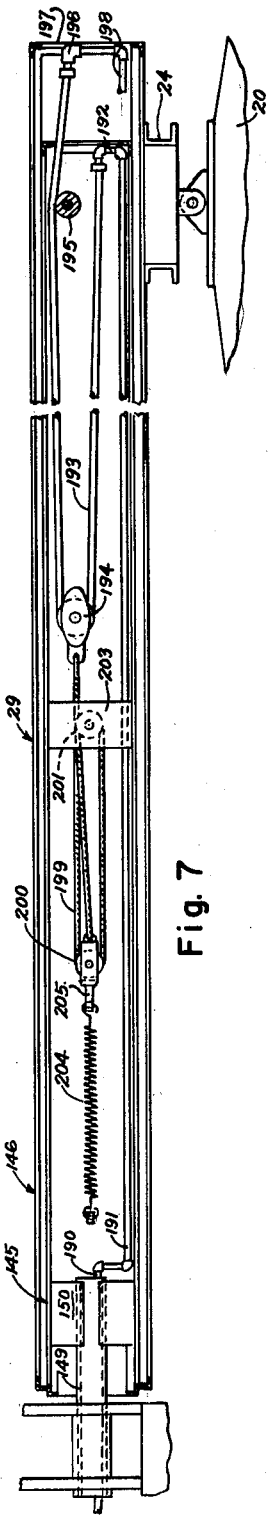
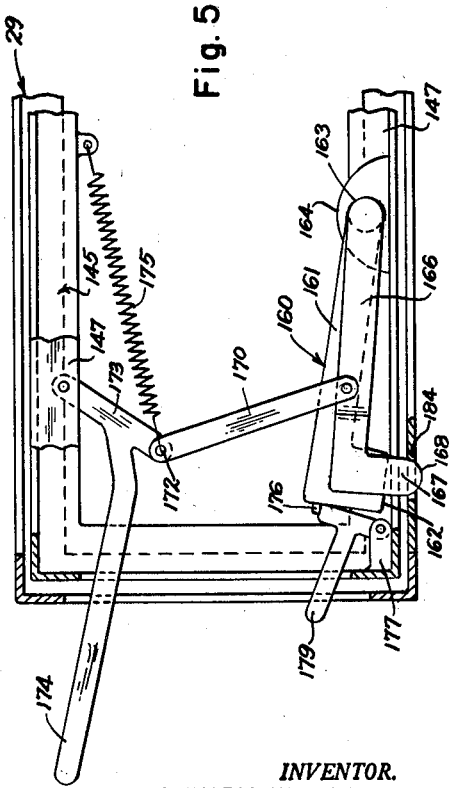
INVENTOR.
HENRY W. BIGGE
BY
ATTORNEY Jan. 12, 1965 H. W. BIGGE 3,165,336
EXTENDABLE REACH FOR TRACTOR-TRAILER VEHICLES
Original Filed Feb. 24, 1961 3 Sheets-Sheet 3

INVENTOR.
HENRY W. BIGGE
BY
ATTORNEY

United States Patent Office 3,165,336
Patented Jan. 12, 1965

3,165,336
EXTENDABLE REACH FOR TRACTOR-TRAILER VEHICLES
Henry W. Bigge, 50 Marsh Place, Oakland, Calif.
Original application Feb. 24, 1961, Ser. No. 91,470, now Patent No. 3,102,735, dated Sept. 3, 1963. Divided and this application Jan. 16, 1963, Ser. No. 266,464
6 Claims. (Cl. 280—421)

This invention relates to trailers of the type used with a tractor truck vehicle for hauling long heavy loads. More particularly, it relates to an extendable reach for connecting the tractor and trailer vehicles. This application is a divisional application of my copending application filed on February 24, 1961, having Serial No. 91,470 and now Patent No. 3,102,735.

In my copending divisional application Serial No. 91,470, I described a steering system for a trailer carrying an unusually long load in combination with a tractor vehicle which enables the trailer vehicle to track directly behind the tractor. For such long load tractor-trailer combinations it is necessary to provide a fixed reach connection between the fifth wheels or load bolsters of the truck and trailer so that when the trailer is being drawn without a load, the steering function is still effective and the trailer load bed will not be free to rotate uncontrollably. A reach connection is also preferable to facilitate the maneuvering of the truck and trailer during the loading operation. A problem which arose concerning the utilization of my trailer steering system with a fixed reach connection was that of providing a reach of extreme length and of sufficient strength to accommodate long, heavy loads, and yet one that could be retracted or telescoped for pulling the trailer with short loads or in the no load position. A further problem which arose in providing such an extendable reach was that of providing a locking means to connect telescoping reach sections. Here, the problem was to provide a locking means that could be unlatched and then would automatically operate to lock the reach sections when the reach was extended to its maximum length and retracted to its minimum length. Without a means to automatically lock the reach section an extra man would be required to connect the locking means manually as the reach sections were being extended to their desired length. This arrangement would be time consuming because it would require exact positioning of the reach sections in order to insert the locking means, which could be a tedious and hazardous operation. My invention provides a positive latching means for connecting the two reach sections that can be locked manually and retained in a preset unlocked position. Then, with the trailer brake set, the tractor vehicle can move the reach in or out and the locking means will automatically operate whenever the reach is either extended to its maximum or minimum length.

It is therefore one major object of the present invention to provide a rigid extendable reach connection between the fifth wheels or load beds of a pair of trailer and tractor vehicles.

In accordance with the present invention, my extendable reach connecting the fifth wheels of a tractor and trailer is provided with at least two telescoping reach sections and has means for locking these connecting reach sections automatically at either the extended or retracted positions. The locking means can be manually unlocked or locked and a novel attached sensing means is provided so that the locking means are automatically tripped into locking position to connect the two reach sections together when a predetermined relative position of the two reach sections is reached.

The invention also includes a novel means for controlling within the movable reach members, air hoses for the trailer brakes or any other flexible conduits which must extend from the truck to the trailer. As the reach is being either extended or retracted the air hoses are always maintained in a stretched out, non-kinked position.

Other objects and advantages and important features of the present invention will become apparent during the course of the following description, references being had therein to the accompanying drawings, in which:

FIG. 1 is a view in elevation showing an extendable reach embodying the principles of the invention attached at one end to the movable bed of a trailer and at its other end to the movable bed on a tractor vehicle;

FIG. 2 is a view in elevation with the tractor and trailer shown in FIG. 1 connected by the reach in its retracted position;

FIG. 3 is an enlarged fragmentary view in elevation and in section showing the dog releasing mechanism of the extendable reach with the dog in the locked position;

FIG. 4 is an enlarged fragmentary view in perspective and in section of the dog releasing mechanism of FIG. 3; an end portion of the outer reach section is shown to illustrate the locking means for the reach in its extended position;

FIG. 5 is an enlarged fragmentary view in elevation and in section showing the dog releasing mechanism, with the dog in the unlocked position;

FIG. 6 is a plan view in section showing the air hose controlling means within the retracted reach sections;

FIG. 7 is a view in elevation and in section of the air hose controlling means shown in FIG. 6;

Figure 9:
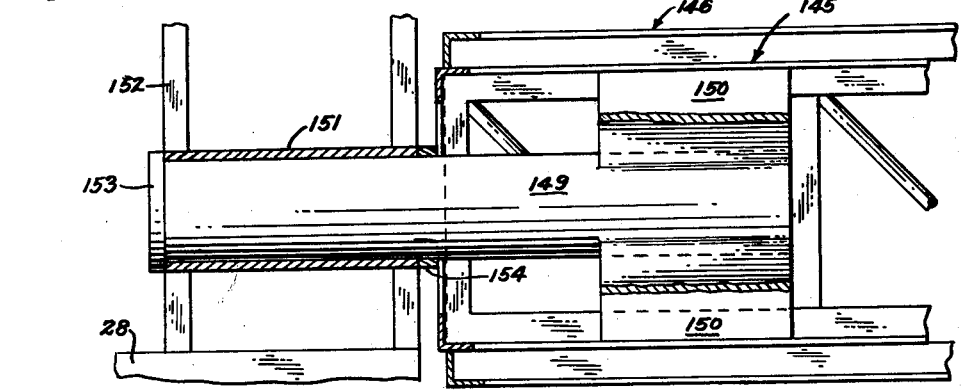
FIG. 9 is an enlarged fragmentary view in section taken along the line 9—9 of FIG. 8.

Broadly considered, my invention as shown in FIGS. 1–10 also provides for the combination of an extendable reach 29 which may be fixed at one end to the movable load bed 24 of a steerable trailer 20 and at its other end to a movable load bed or bolster 28 on a tractor vehicle 27.

As shown in FIG. 1, the reach 29 is extendable to a relatively long length when the tractor 27 and the trailer 20 are loaded (FIG. 1), and it can be retracted or telescoped when no load is being carried, as shown in FIG. 2.

As shown in FIGS. 1 and 2, the reach 29 comprises an inner reach section 145 which is connected to the tractor load bed 28 and which is slidable within an outer section 146 attached to the movable load bed 24 on the steerable trailer 20 equipped with the steerable linkage according to the invention as described in my copending application Serial No. 91,470. Both reach sections 145 and 146, are fabricated from structural steel members in a general box beam configuration, but other forms of telescoping structural configurations can be used within the scope of the invention.

Figure 8:
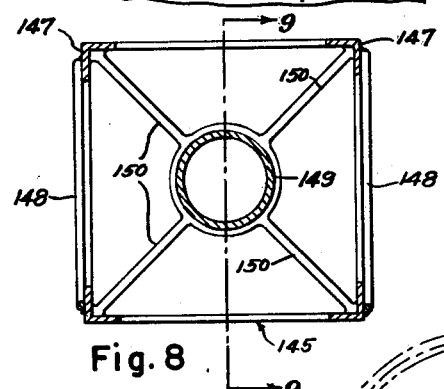
FIG. 8 is an enlarged view in end elevation and in section taken along line 8—8 of FIG. 1 showing the inner reach in cross section and the swivel connection of the reach to the tractor load bed.
Figure 10:
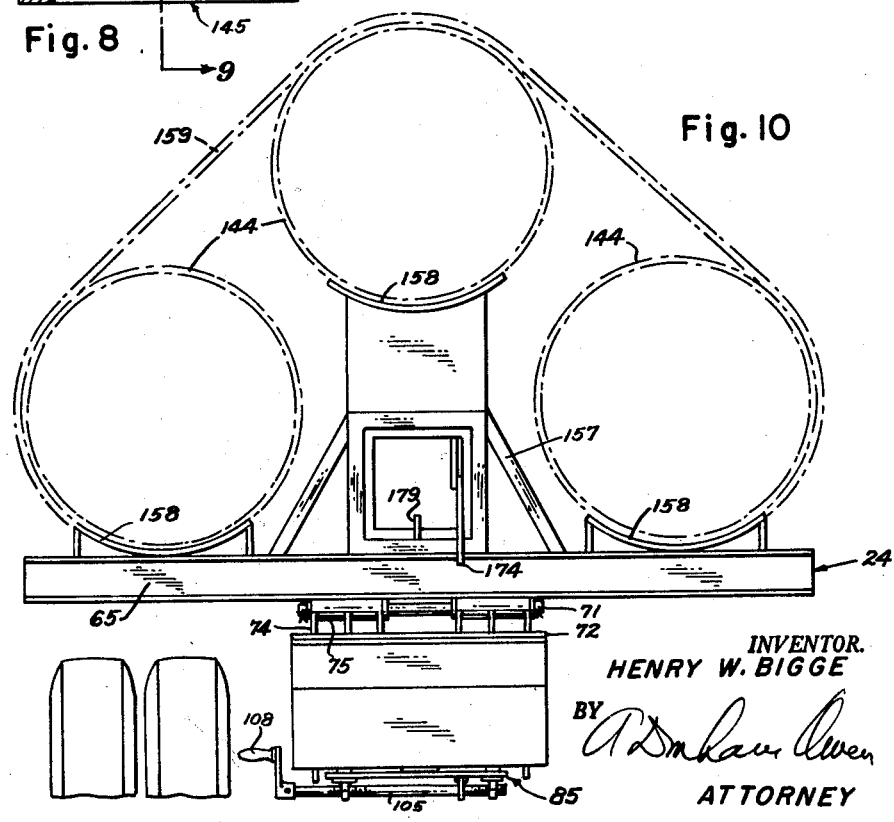
FIG. 10 is an enlarged view in elevation and in section taken along the line 10—10 of FIG. 1 showing the reach connection on the trailer load bed in detail.

The inner reach section 145 is formed by four parallel longitudinal members 147 held together by diagonal side bracing members 148. As shown in FIG. 9, the section 145 is attached to the tractor load bed 28 preferably by means of cylindrical member 149 which allows longitudinal twisting of the trailer 20 relative to the tractor 27. At the forward end of the inner reach section 145 the cylindrical member 149 is fixed between the longitudinal members 147 by internal diagonal bracing members 150 (FIG. 8). The cylindrical member 149 extends beyond the ends of the longitudinal members 147 and is adapted to fit within a cylindrical sleeve member 151 which is fixed to a support frame 152 on the tractor load bed 28. A circular cap 153 welded to the end of the cylindrical member 149 and a collar member 154 attached at a fixed distance from the end thereof, serve to retain the cylindrical member 149 within the sleeve 151 on the support frame 152.

The outer reach section 146 has the same cross sectional rectangular shape but is slightly larger than the inner reach section 145 and is formed by longitudinal structural members 155 connected by side bracing members 156. One end of the outer reach section 146 is fixedly attached in a suitable manner and supported by a frame 157 on the movable load bed 24 of the trailer 20 as shown in FIG. 7.

The reach 29 is centrally located on both of the movable load beds 28 and 24 on the tractor 27 and trailer 20, respectively. To provide maximum load carrying capacity when using the reach 29, I prefer to provide a means to support a load both on top of and on both sides of the reach structure. Thus on top of both the support frame 152 on the tractor vehicle 27 and the support frame 157 on the trailer, may be fixed curved carrying-saddles 158. Similar carrying saddles 158 may be attached directly to the load beds 28 and 24, on either side of the support frames 152 and 157 of the tractor 27 and the trailer 20 respectively. The carrying saddles 158 are preferably formed from rectangular sections of sheet metal which are curved so as to cradle the ends of long cylindrical loads to be transported by the trailer 20. Suitable straps 159 attached to the load beds 24 and 28 may be provided to secure the long load members 144 at both of their ends.

An important feature of my extendable reach 29 is a novel self-actuating latching mechanism 160 which connects together the inner and outer reach sections 145 and 146 and allows the reach 29 to be extended or retracted easily by one person. As shown in FIGS. 3 and 4, the inner reach member 145 attached to the tractor 27 has a locking dog member 161 which is substantially L-shaped and has a downwardly extending integral end portion 162 that is adapted to connect the two reach members 145 and 146 in both the retracted and extended positions. The dog member 161 is connected to a shaft 163 which is supported between a pair of bearing support members 164 on a cross member 165 that is connected between two lower longitudinal members 148 of the reach section 145. At the end of the shaft 163 is fixed a lever arm 166 which extends parallel and in the same direction as the dog 161 and which has, at its end, a downwardly extending projection 167 having a curved lower edge 168 that acts as a cam follower to control the locking of the dog member 161. The lever arm 166 is positioned on the shaft 163 in such a manner that the curved lower edge 168 extends well below the horizontal level of the dog 161 and is aligned with a horizontal flange 169 of a lower longitudinal member 155 of the outer reach section 146. A link 170 is pivotally connected at one of its ends near the mid point 171 of the lever arm 166 and is pivotally connected by a pin 172 at its other end to a T-shaped link 173. The link 173 has a handle portion 174 and is also connected at its upper end to an upper longitudinal member 147 of the inner reach section 145. A spring member 175 is connected to an end of the T-shaped link 173 near its pin connection 172 to the link 170 and is also connected to the upper longitudinal member 147. Thus, movement of the handle 174 up and down serves to move the dog 161 upward or downward, but the weight of the dog 161 provides a force which is always greater than the spring 175, and which tends to rotate the dog 161 and the lever arm 166 constantly downward by means of the shaft 163.

At the end of the dog 161 is a retaining projection 176 and pivotally mounted on a bracket 177 on the end of the inner reach section 145 (FIGS. 3 and 4) is a retaining post 178 having an integral handle 179 which, by virtue of its weight, normally tends to rotate the post 178 in the counterclockwise direction as shown in FIG. 17. The post 178 acts to fit under the projection 176 to retain the dog 161 in its upward retracted position when the reach 29 is to be extended.

The inner and outer reach sections 145 and 146 are connected in their retracted position by means of the dog 161 which, in its locking position fits within a rectangular hole 180 in a cross member 181 connected between the lower longitudinal members 155 of the outer reach section 146. In the horizontal flange 169 of the lower longitudinal member 155 of the outer reach section 146 is a rectangular slot 183 which has the proper size and rectangular shape to receive the downwardly extending projection 167 on the lever arm 166 of the dog control linkage 160. The lower longitudinal member 147 of the inner reach section 145 that lies directly above the longitudinal member 155 having the slot 183, is provided with a cutout portion 185 so that the downwardly extending projection 167 of the sensing lever 166 will extend through the cutout portion 185 to contact the horizontal flange 169 of the longitudinal member 155 below. Thus, since the projection 167 is free to engage the horizontal flange 169 of the longitudinal member 155, it will either drop in the slot 183 or be raised upward when it engages the end 184 of the slot 183 on the flange 169.

Near the outer end 186 of the outer reach section 146 is located a cross member 187 similar to the cross member 181 and having an opening 188. A slot 189 similar to the slot 183 is also provided in the flange 169 of the lower longitudinal member 155, the slot 183 being in transverse alignment with the opening 188.

Thus, with the reach 29 in the retracted position, when it is necessary to extend its length, the dog member 161 is raised manually by means of the lifting linkage 160 operated by the handle 174. When the handle 174 is pulled down, the dog 161 is raised out of the opening 180, and the downwardly extending projection 167 on the sensing lever arm 166 is simultaneously raised upward until only the curved lower edge 168 is left extending downward into the slot 183. The dog 161 and the projection 167 are held in this position by the retaining post 178 which is manually moved up under the projection 176 (see FIG. 5). With the trailer brakes on, the tractor 142 is then moved forward and the inner reach 145 slides outwardly relative to the outer reach 146. The curved lower edge 168 of the downwardly extending projection 167 engages the end 184 of the slot 183 and cams the lever arm 166 upward, pushing the dog 161 upward and causing the retaining post 178 to be released and to fall away. Thus, as the inner reach section 145 moves out of the outer reach section 146, the projection 167 on the lever arm 166 slides along the horizontal flange 169 until it reaches the outer slot 189 near the end 186 of the outer reach section. At this point the sensing projection 167 drops into the slot 189 allowing the end portion 162 of the dog 161 to drop into the aligned opening 188 in the cross member 181, thus connecting the two reach sections 145 and 146 at their outer ends as shown in FIG. 1.

Without the aforementioned latching mechanism or its equivalent, the insertion and retraction of the locking dog 161 would have to be done manually as the reach section reached the proper relative position. This would require additional time and manpower and would entail the risk of mishap during the reach extending procedure.

Another important feature of my novel reach 29, as shown in FIGS. 6 and 7, is a system for controlling the disposition of flexible hoses, cables or wires which must extend from the tractor vehicle to the trailer in most conventional trailer hookups to control the brakes, lights or other equipment. For example, trailer brakes are generally supplied by a compressed air source on the tractor, and thus long hoses must be provided from the tractor for this purpose. When the reach is extended or retracted, the hoses must, of course, be paid out or doubled up, and yet this must be done without causing any sharp twists, turns or kinking of the hoses.

In FIGS. 6 and 7 a pair of conduits 190, which may be connected to a compressed air source (not shown), extend through the cylindrical member 149 on the tractor end of the inner reach section 145. Fixed hose conduit members 191 are connected to the conduits 190 and are arranged to lie along a lower longitudinal member 147 of the inner reach section 145. Attached to the rear ends of the fixed conduits 191 are suitable adapter fittings 192 to which are attached a pair of flexible hose conduits 193. The flexible hose conduits 193 are approximately the length of the outer reach section 146 and they extend around a simple pulley 194 that is mounted within the reach sections 145 and 146. After passing around the pulley 194 the flexible hoses 193 are preferably supported by a roller 195 which is fixed near the rear end of the inner reach 145. The hoses 193 pass through the end of the inner reach 145 and are connected to a pair of fixed adapters 196 which are mounted on the end 197 of the outer reach section 146 attached to the trailer load bed 24. From the adapters 196 hoses 198 are connected to the trailer brakes (not shown).

The pulley 194 is movably retained within the reach sections 145 and 146 by means of a cable 199 which extends toward the tractor 27 around a second pulley 200 within the reach sections 145, 146. To provide an additional mechanical advantage, the cable 199 is looped once around the pulley 200 and around a fixed wheel or roller 201 mounted on a shaft 202 retained between a pair of cross-bars 203 on the inner reach 145, before returning and being fixed to the pulley 200. The pulley 200 is supported within the inner reach 145 by a pair of coiled spring members 204 which extend from a bracket 205 on the pulley 200 to mounting brackets 206 fixed at a predetermined location to the inner reach member 145.

The action of the pulleys 194 and 200 in combination with the springs 204 serves to keep the hoses 193 (or any other flexible conduit) taut and free from any twisting during all movements between the reach sections 145 and 146 and relative positions of the tractor 27 and the trailer 20. For example, when the reach sections 145, 146 are moved apart from the position shown in FIGS. 6 and 7, the flexible hoses 193 pass through the pulley 194 as it moves rearward within the inner reach section 145. But, since the pulley 194 is tied by the cable 199 around the pulley 200, the movement required of the pulley 200 is one-third that of the pulley 194, and a large amount of deflection of the coiled springs 204 is not required. Other mechanical ratios could, of course, be used. When the reach sections 145 and 146 are retracted, the springs 204 exert tension on the pulleys 194 and 200 and cause them to return the flexible hoses to the taut untwisted position within the inner reach section 145.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An extendable trailer reach for connecting a steerable trailer vehicle having a movable load bed with a tractor vehicle also having a movable load bed, said reach comprising: an outer reach section connected at one end to the load bed of one of said vehicles and an inner reach section connected at one end to the load bed of the other said vehicles and slidable within said outer reach section; a pair of cross bars located near the opposite ends of said outer reach section, each said cross bar having an opening; a locking dog means pivotally attached to said inner reach section and having an end portion axially aligned with and adapted when lowered, to enter the said opening of the adjacent cross bar to connect said reach section at either the retracted or extended position; sensing means connected to said dog means to control the movement of said dog means, said sensing means comprising a cam follower rigidly fixed to said locking dog and positioned to normally ride along a longitudinal member of said outer reach as the reach sections are being moved apart; slot means on said outer reach section having the same relative position to a said opening in said cross bar as said sensing means has to the location of said end portion of said locking dog means; whereby as said inner reach section is being moved relative to said outer reach section, said sensing means will keep its attached locking dog raised and disconnected and will lower said locking dog into said opening when said sensing means drops within a said slot.

2. The device as described in claim 1 including means connected to said sensing means and said locking dog means to manually raise said locking dog; means to retain said locking dog in the raised position; said sensing means including a curved lower edge surface adapted to lie within a said slot means in said longitudinal member of said outer reach section when said locking dog is initially retained in the raised position, the end of said slot means thereby engaging said sensing means to release said retaining means during relative movement between said outer reach section and said inner reach section.

3. An extendable trailer reach for connecting a steerable trailer vehicle having a movable load bed with a tractor vehicle also having a movable load bed, said reach comprising: an outer reach section connected at one end to the load bed of one of said vehicles and an inner reach section connected at one end to the load bed of the other said vehicle and slidable within said outer reach section; a pair of retaining cross bars located near the opposite ends of said outer reach section, each said cross bar having an opening; a locking dog means pivotally attached to said inner reach section and having an end portion axially aligned with and adapted when lowered, to engage a said retaining bar to connect said reach section at either the retracted or extended position; sensing means connected to said dog means to control the movement of said dog means, said sensing means comprising a cam follower rigidly fixed to said locking dog and positioned to normally ride along a longitudinal member of said outer reach as the reach sections are being moved apart; slot means on said outer reach section having the same relative position to a said opening in said cross bar as said sensing means has to the location of said end portion of said locking dog means; flexible conduit means mounted within said inner reach; and means for retaining said conduit means in a taut unkinked position as said reach sections are drawn apart and retracted together.

4. An extendable trailer reach for connecting a steerable trailer vehicle with a tractor vehicle, said reach comprising: an outer reach section connected at one end to said trailer vehicle and an inner reach section connected at one end to said tractor vehicle and slidable within said outer reach section; a retaining cross bar located near each opposite end of said outer reach section, each said cross bar having an opening; a locking dog means pivotally attached to said inner reach section and having an end portion axially aligned with and adapted when lowered, to enter a said opening and to connect said reach sections together at either the retracted or extended position; sensing means connected to said dog means to control the movement of said dog means, said sensing means comprising a cam follower rigidly connected to said locking dog and positioned to normally ride along a longitudinal member of said outer reach as said inner and outer reach sections are being moved apart; slot means on said outer reach section having the same relative position to a said opening in a said cross bar as said sensing means has to the location of said end portion of said locking dog means; whereby as said inner reach section is being moved relative to said outer reach section, said sensing means will keep its attached locking dog raised and disconnected and will lower said locking dog into said opening when said sensing means drops within a said slot.

5. An extendable trailer reach for connecting a steerable trailer vehicle bed with a tractor vehicle, said reach comprising: an outer reach section connected at one end to said trailer vehicle and an inner reach section connected at one end to said tractor vehicle and slidable within said outer reach section; means for connecting said inner and outer reach sections together at the extended and retracted positions; flexible conduit means extending from said tractor vehicle to said trailer vehicle through said reach sections, said conduit having an elongated loop intermediate the ends thereof, the ends of the loop being connected to the adjacent ends of the respective reach sections; and means for controlling the extension and retraction of said flexible conduit while providing a constant tension on said flexible conduit within said reach sections during the extension and retraction of said reach sections, said latter means including a first movable pulley connected to said first movable pulley and looped around and connected to a second pulley, said cable also being looped around a fixed pulley to thereby provide an increased ratio of movement of said first pulley relative to said second pulley; and spring means for connecting said second pulley to said inner reach section.

6. An extendable trailer reach for connecting a steerable trailer vehicle bed with a tractor vehicle, said reach comprising: an outer reach section connected at one end to said trailer vehicle and an inner reach section connected at one end to said tractor vehicle and slidable within said outer reach section; means for connecting said inner and outer reach sections together at the extended and retracted positions; flexible conduit means extending from said tractor vehicle to said trailer vehicle through said reach sections, said conduit means having an elongated loop intermediate the ends thereof, the ends of the loop being connected to the adjacent ends of the respective reach sections; and means for controlling the extension and retraction of said flexible conduit while providing a constant tension on said flexible conduit within said reach sections during the extension and retraction of said reach sections, said means comprising a first movable pulley connected within said loop of said flexible conduit; means connecting said first pulley to one of said reach sections and a second pulley for supporting said flexible conduit and causing said first pulley to exert a constant tension force on said flexible conduit to keep it stretched out, said pulleys being movable axially relative to both of said reach sections as the reach is extended and retracted.

References Cited in the file of this patent
UNITED STATES PATENTS

| | | |
|---|---|---|
| 2,197,401 | Weber | Apr. 16, 1940 |
| 2,730,183 | Svoboda | Jan. 10, 1956 |
| 2,818,272 | De Lay | Dec. 31, 1957 |
| 3,087,741 | De Lay | Apr. 30, 1963 |
| 3,102,735 | Bigge | Sept. 3, 1963 |

UNITED STATES PATENT OFFICE
CERTIFICATE OF CORRECTION

Patent No. 3,165,336                              January 12, 1965

Henry W. Bigge

It is hereby certified that error appears in the above numbered patent requiring correction and that the said Letters Patent should read as corrected below.

Column 2, line 42, strike out "also"; column 5, line 72, for "vehicles" read -- vehicle --; column 7, line 26, before "to" insert -- within said loop of said flexible conduit; a cable connected --.

Signed and sealed this 20th day of July 1965.

(SEAL)
Attest:

ERNEST W. SWIDER                                 EDWARD J. BRENNER
Attesting Officer                                    Commissioner of Patents